United States Patent [19]

Davis et al.

[11] Patent Number: 4,486,689

[45] Date of Patent: Dec. 4, 1984

[54] EMERGENCY LIGHTING APPARATUS AND SYSTEMS

[75] Inventors: David W. Davis, Arlington, Tex.; George W. Plumly, 9900 Edmund Dr., Fort Worth, Tex. 76112

[73] Assignee: George W. Plumly, Fort Worth, Tex.

[21] Appl. No.: 467,775

[22] Filed: Feb. 18, 1983

[51] Int. Cl.[3] .......................... H05B 39/10; H02J 7/00

[52] U.S. Cl. .......................................... 315/92; 307/66; 315/88

[58] Field of Search ........................ 315/88, 92; 307/66

[56] References Cited

U.S. PATENT DOCUMENTS

| | | | |
|---|---|---|---|
| 3,573,541 | 4/1971 | Dunn | 315/92 |
| 4,144,462 | 3/1979 | Sieron et al. | 307/66 |
| 4,216,410 | 8/1980 | Feldstein | 307/66 |
| 4,297,614 | 10/1981 | Chandler | 307/66 |

*Primary Examiner*—Harold Dixon

*Attorney, Agent, or Firm*—Wm. T. Wofford; James C. Fails; Arthur F. Zobal

[57] ABSTRACT

An emergency lighting unit having physical dimensions and electrical and electronic components and circuitry such that it can be directly substituted for a conventional hot cathode type fluorescent lamp in a conventional fluorescent lamp fixture which incorporates a rapid start type ballast. The emergency lighting unit comprises a direct current power supply in the form of rechargeable batteries, a light source in the form of one or more groups of low voltage high intensity miniature lamps, and electronic circuitry and components utilizing power supplied by the rapid start ballast for charging the batteries, monitoring their condition and reacting accordingly, and detecting the state of the normal alternating current power source and reacting accordingly. In a preferred embodiment, the emergency lighting unit utilizes pulses to detect the emergency or "FAIL" state of the system power. The pulses are supplied by a unique pulser unit which is designed to be directly substituted for a standard wall switch.

98 Claims, 11 Drawing Figures

19,21

EMERGENCY LIGHTING APPARATUS AND SYSTEMS

FIELD OF INVENTION

The present invention relates to emergency lighting apparatus and systems for use in installations in which the normal lighting is supplied by fluorescent lamps and the normal power is alternating current from a commercial utility source.

DESCRIPTION OF THE PRIOR ART

There have been various approaches, in the prior art of which I am aware, to the problem of providing emergency lighting in an environment in which the normal lighting is supplied by fluorescent lamps and the normal power is alternating current from a commercial utility source.

Some prior art arrangements provide for a plurality of direct current power packages, one of which is to be disposed in each of a number of strategic locations. Each such direct current power package is self-contained and is entirely separate from the fluorescent lighting fixtures. Further, each such direct current power package will contain a battery or batteries and one or more battery powered light sources. Each such direct current power package may also include means for maintaining the battery or batteries in a charged condition. Emergency lighting systems which utilize these direct current power packages are subject to a number of disadvantages. Installation space is required which can create problems, both as to the effectiveness of location and as to asthetics. If battery charging means is included, suitable wiring must be provided. Thus, significant costs for installation design and installation must be incurred.

Other prior art arrangements incorporate a secondary power source (batteries) within a fluorescent light fixture and utilize the batteries to power one fluorescent lamp of the fixture at a reduced light level during emergency conditions. Such arrangements have not proved to be entirely successful, partly due to the high demand on the batteries and the level of light produced during emergency conditions. An example of such arrangement is found in U.S. Pat. No. 4,323,820.

The objective of this invention is to provide improved emergency lighting apparatus and systems for use in installations in which the normal lighting is supplied by fluorescent lamps and the normal power is alternating current from a commercial utility source.

DESCRIPTION OF THE PREFERRED EMBODIMENTS

The present invention provides advantageous emergency lighting apparatus and systems for use in installations in which the normal lighting is supplied by fluorescent lamps and the normal power is alternating current from a commercial utility source. In accordance with one aspect of the invention, in a preferred embodiment, all of the components necessary for providing emergency light, with the exception of a part of the utility power state detector system, are contained within an elongated tube structure referred to herein as an "emergency lighting unit". The emergency lighting unit is designed to be interchangable with any fluorescent lamp in a conventional rapid start type fluorescent light fixture which utilizes $1\frac{1}{2}$ inch by 48 inch 40 watt hot cathode type fluorescent lamps.

Figures 1, 2:
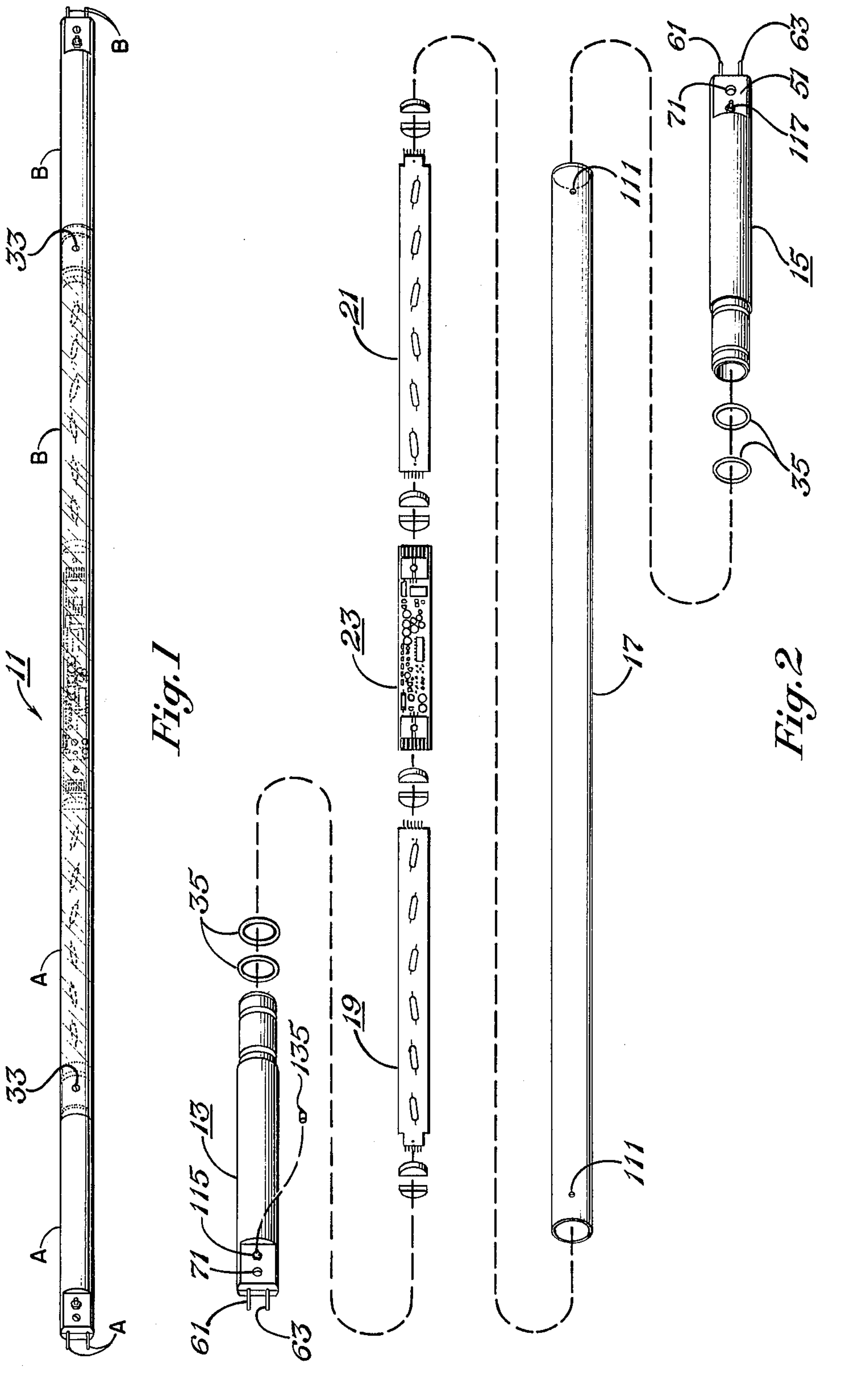
FIG. 1 is a schematic perspective view showing an emergency lighting unit in accordance with a preferred embodiment of the invention, with some interior parts shown in dotted outline.
FIG. 2 is a schematic exploded view of the emergency lighting unit of FIG. 1, showing major components thereof.
Figures 3, 4:
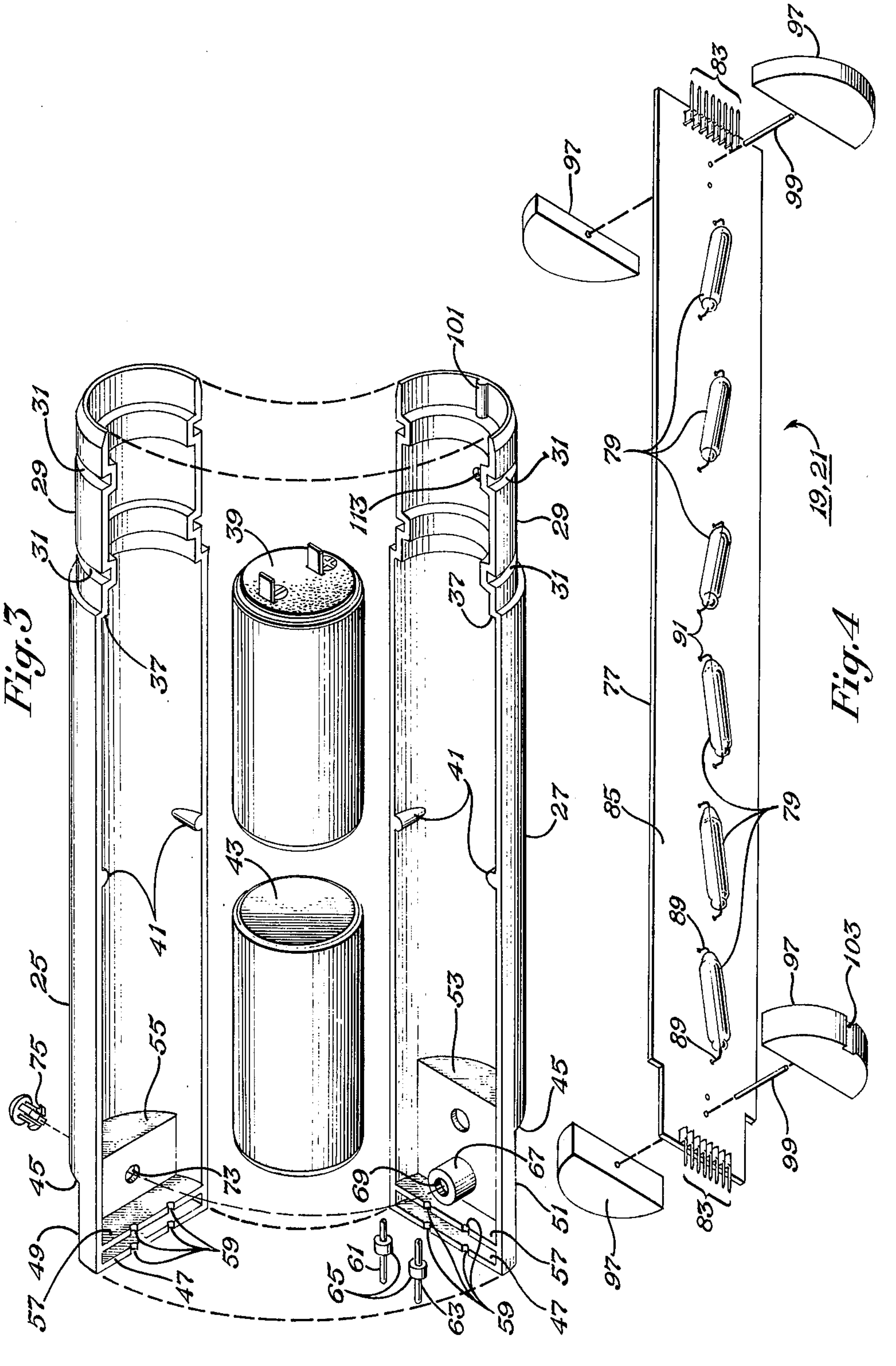
FIG. 3 is a schematic exploded view of one of the battery compartments of the emergency lighting unit and its batteries.
FIG. 4 is a schematic perspective view, partially exploded, showing the front side of one of the lamp boards of the emergency lighting unit and its associated bulk-head parts.
Figure 5:
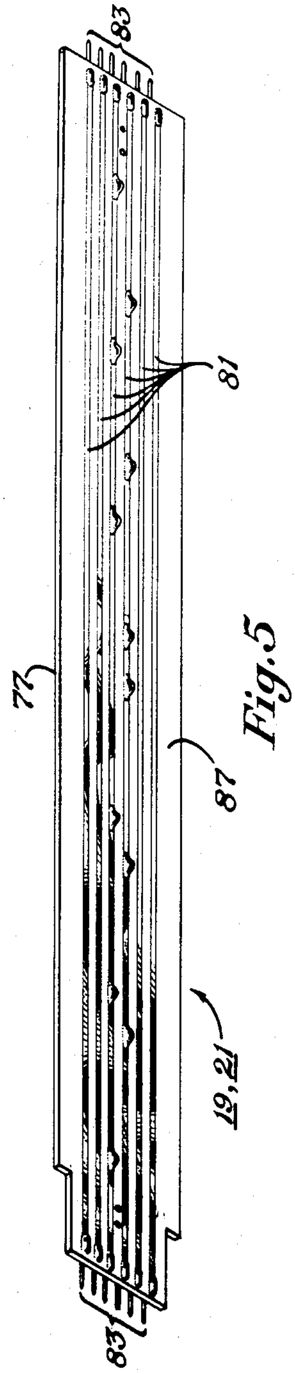
FIG. 5 is a schematic perspective view, showing the rear side of one of the lamp boards of the emergency lighting unit.
Figure 6:
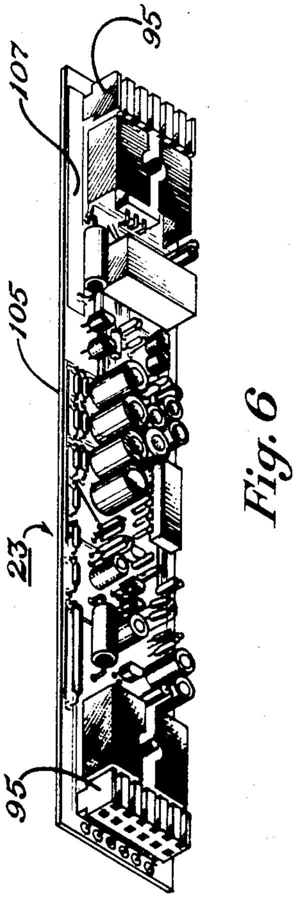
FIG. 6 is a schematic perspective view, showing the front side of the electronics board of the emergency lighting unit.
Figure 7:
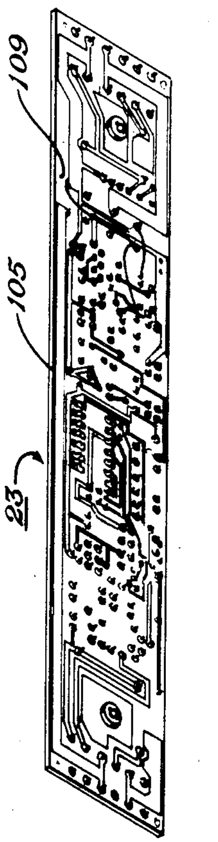
FIG. 7 is a schematic perspective view, showing the rear side of the electronics board of the emergency lighting unit.

An emergency lighting unit in accordance with the invention is shown by FIGS. 1-7 of the drawings. FIG. 1 shows a fully assembled emergency lighting unit 11 which has the shape of a cylindrical tube, with some interior parts shown in dotted outline. In the exploded view of FIG. 2, the major components of the emergency lighting unit, except batteries, can be seen. These are two generally cylindrical battery compartments 13, 15, a cylindrical housing 17, two lamp boards 19, 21 and an electronics board 23.

It can be seen that when the two battery compartments 13, 15 are assembled with the cylindrical housing 17, the resulting structure is an elongated cylindrical tube of substantially the same diameter and length as a conventional $1\frac{1}{2}$ inch by 48 inch 40 watt hot cathode fluorescent lamp and having also end connection pins comparable to the bi-pin base ends of such fluorescent lamp. It should then be apparent that, at least from the physical standpoint, an emergency lighting unit 11 can simply be substituted for a fluorescent lamp in a standard fluorescent lamp fixture.

The battery compartments 13, 15 are essentially identical and are each made up of upper and lower complementary halves 25, 27. Each half 25, 27 is in the form of a generally cylindrical trough having a semi-circular cross-section. Each half 25, 27 has an inboard end portion 29 of reduced outer diameter with O-ring grooves 31. These reduced diameter portions are matingly received by the inner surfaces of the outer portions of the cylindrical housing 17 and are secured against longitudinal movement by means of screws 33. O-rings 35 disposed in the grooves 31 provide suitable sealing means. Each battery compartment 13, 15 is designed to house two batteries of a suitable type and which have a cylindrical shape. The reduced diameter of the inboard end portion 29 provides a shoulder 37 which limits movement of an inboard battery 39 in the inboard direction. Bosses 41 are formed on interior surfaces of the battery compartment halves 25, 27 so as to limit movement of the inboard battery 39 in the outboard direction and movement of an outboard battery 43 in the inboard direction. The battery compartment halves 25, 27 are provided stepped outboard end wall portions 45, 47 which merge with a respective rectangular planar exterior surface 49, 51. The rectangular planar exterior surface 51 is made longer than rectangular planar exterior surface 49, so that the interior surface 53 of the lower outboard end wall portion 45 will act as a stop to limit movement of the outboard battery 43 in the outboard direction, and also as to provide some space between the outboard end of the outboard battery 43 and the interior surface 55 of the upper outboard end wall portion 45, for a purpose to be hereinafter explained. Each battery compartment half 25, 27 has formed on it a generally rectangular bulkhead 57 which is spaced a short distance inboard of the outboard end wall portion 47. Two sets of longitudinally aligned semi-circular slots 59 are formed in the complimentary surfaces of the end wall portions 47 and the bulkheads 57 which are disposed in abutting relation when the battery compartment halves 25, 27 are assembled. A conductor pin 61, 63 is disposed in each set of slots 59 and is clamped therein when the battery compartments halves 25, 27 are assembled. The conductor pins 61, 63 are provided enlarged diameter portions 65 which are received in the space between the end wall portions 47 and the bulkheads 57 and prevent movement of the pins 61, 63 in the longitudinal directions. The conductor pins 61, 63 correspond to the base pins of a conventional 1½ inch by 48 inch 40 watt hot cathode type fluorescent lamp and are located and spaced accordingly. A cylindrical boss 67 is formed to extend inwardly from the interior surface of the rectangular planar exterior surface 51 of the lower battery compartment half 27. The cylindrical boss 67 is provided a first bore 69 and a re-entrant bore 71. The first bore 69 is aligned with a corresponding bore 73 through the rectangular planar exterior surface 49 of the upper battery compartment half 25. A suitable fastener 75, which in the preferred embodiment is of the plastic type having an expandable locking end portion, is, when the upper and lower battery compartments 25, 27 are assembled, inserted from the upper battery compartment side through the bores 73, 69 so that its locking end portion is disposed within the reentrant bore 71.

The light boards 19, 21 are essentially identical. Each light board comprises a base 77, a plurality of miniature lamps 79, a plurality of conductors 81, and a set of male end plugs 83 for each conductor. The light board base 77 is made of conventional printed circuit board material which is a non-conductive material having a thin conductive backing which is etched to leave the desired electrical connections, which in this case are the conductors 81. The base 77 has the shape of an elongated rectangle having a width substantially equal to the inside diameter of the cylindrical housing 17 and a length sufficient to accommodate the desired number of miniature lamps 79 and to fit in the space between the inboard end of the battery compartments 13, 15 and the outboard ends of the electronics board 23. In a preferred embodiment, each light board 19, 21 accommodates six miniature lamps 79. The miniature lamps 79 are mounted on the front side of the base 77 by means of their wire end terminals 89 which extend through openings 91 in the base 77 and are soldered to the respective conductors 81, such that the lamps 79 are connected in parallel to the central pair of the respective conductors 81. The remaining conductors 81 serve as through conductors connecting their respective set of end plugs 83. The miniature lamps 79 are disposed in a staggered configuration so that the inboard wire end terminals 89 of half are connected to one respective conductor 81 and half to the other. Each end plug 83 is mounted to the front side of the base 77 and has a pair of integral prongs which extend through openings in the base 77 and are soldered to the end portion of a respective conductor 81. The outboard end plugs 83 are received by respective mating female connector blocks (not shown) that are disposed within the battery compartments 13, 15 at their inboard end portions. The inboard end plugs 83 are received by respective mating female connector blocks 95 that are mounted to the outboard end portions of the electronics board 23.

A pair of generally semi-circular bulkhead pieces 97 are disposed at each end portion of each lamp board 19, 21 such that the lamp board base 77 is clamped between them and secured against longitudinal movement by a retainer pin 99 which passes through an opening in the light board base 77 and is received by mating bores in the bulkhead pieces. The light board base 77 has a reduced width at its outboard end portion so as to be received by the interior surface of battery compartment reduced diameter inboard end portion 29. The inboard end portion of the interior surface of the battery compartment end portion 29 is provided a longitudinally extending boss 101 which mates with a slot 103 on the exterior surface of the lower bulkhead piece 97 on the outboard end of the lamp board 77 base so as to properly orient the light boards 19, 21 and prevent any rotational movement of same. The surface of the front side 85 of the light board base 77 is made light reflective, preferably by means of suitable white paint.

The electronics board 23 comprises a base 105, female connector blocks 95, and various electrical components which will be hereinafter explained. The electronics board base 105 is made of conventional printed circuit board material which is a non-conductive material having a thin conductive layer on both sides which is etched to leave behind the desired electrical connections. The base 105 has the shape of an elongated rectangle having a width substantially equal to the inside diameter of the housing 17 and a length sufficient to accommodate the various electrical components to be mounted on it and to fit in the space between the inboard ends of the lamp boards 19, 21 when they are assembled in the emergency lighting tube 11. The various electrical components, such as resistors, capacitors, transistors, diodes, integrated circuits, electronic relays, etc., are mounted to the front side 107 of the base 105. The various desired electrical connections are made on both the front side 107 and the back side 109 of the electronics board base 105.

The battery compartment halves 25, 27 are preferably injection molded using an opaque plastic material, for example polyphenyloxcide plastic such as the General Electric Company's NORYL HS2000 which can pass U.L. 5 V temperature test. The cylindrical housing 17 is preferably extruded using plastic material and technique resulting in a front portion which is clear translucent or transparent, with the rest being opaque white. Suitable plastic material would be a polycarbonate plastic such as General Electric Company's LEXAN. It is preferable that about 220° of the circular section of the cylindrical housing 17 be white opaque.

To assemble the emergency lighting unit 11, the battery compartments 13, 15 are first assembled, then the light boards 19, 21 with bulkhead parts 97 in place are plugged into the electronics board 23 and that assembly is inserted in the cylindrical housing 17. Then the outboard end plug 83 of a light board 19, 21 is mated with the female connector block (not shown) associated with the battery compartment 13, 15, and an end portion of the cylindrical housing 17 is assembled on the inboard end portion 29 of the battery compartment 13, 15. It should be noted that the assembly of the light boards 19, 21 and the electronics board 23 is properly oriented relative to the battery compartment 13, 15 because of the mating of the boss 101 and the slot 103. The cylindrical housing 17 is rotated on the battery compartment 13, 15 to align its retainer opening 111 with the retainer screw receiver opening 113 of the battery compartment lower half 27, at which time the cylindrical housing 17 is properly oriented relative to the light boards 19, 21. A retainer screw 33 is then inserted and secured. Next, the outboard end plug 83 of the other light board 19, 21 is mated with the female connector block (not shown) associated with the other battery compartment 13, 15, and the other end portion of the cylindrical housing 17 is assembled on the inboard end portion 29 of the other battery compartment 13, 15. The cylindrical housing 17 is rotated relative to the other battery compartment 13, 15 to align its retainer opening 111 with the retainer screw receiver opening 113 of the battery compartment lower half 27, at which time the other battery compartment 13, 15 is properly oriented. A retainer screw 33 is then inserted and secured.

It should be noted that there is mounted at the outboard end portion of one of the battery compartments 13 a safety switch 115, and on the other battery compartment a test switch 117, both of which will be hereinafter fully explained. Each of the safety switch 115 and the test switch 117 have their actuator portion extending outwardly from the rectangular planar exterior surface 51, with the rest of the switch being disposed in the space between the outboard end of the outboard battery 43 and the interior surface 55 of the upper outboard end wall portion 45.

As has been hereinbefore pointed out, the emergency lighting unit 11, from the physical standpoint, can be simply substituted for a fluorescent lamp in a standard fluorescent lamp fixture. It will now be explained how the emergency lighting unit 11 can also from the electrical standpoint be simply substituted for a fluorescent lamp in a standard fluorescent lamp fixture. In order for such substitution to be feasible in the context of an effective emergency lighting unit, a number of requirements must be met. An effective emergency power source in the form of suitable storage batteries must be housed within the emergency lighting unit 11. An effective emergency light source to be powered by the storage batteries must be housed within the emergency lighting unit 11. The storage batteries must be of the rechargeable type and the power for charging the storage batteries must be available at the pin connections of the standard fluorescent light fixture. The state of the normal alternating current electric power source must be detectable at the pin connections of the standard fluorescent fixture. When the standard fluorescent light fixture is of the 2 or more lamp type, the fluorescent lamp or lamps remaining in the fixture must be permitted to operate normally. The electrical circuitry and components necessary for charging the batteries, protecting the batteries, detecting the state of the normal alternating current electric power source and controlling the emergency light source accordingly, must be housed within the emergency lighting unit 11.

Figure 9:
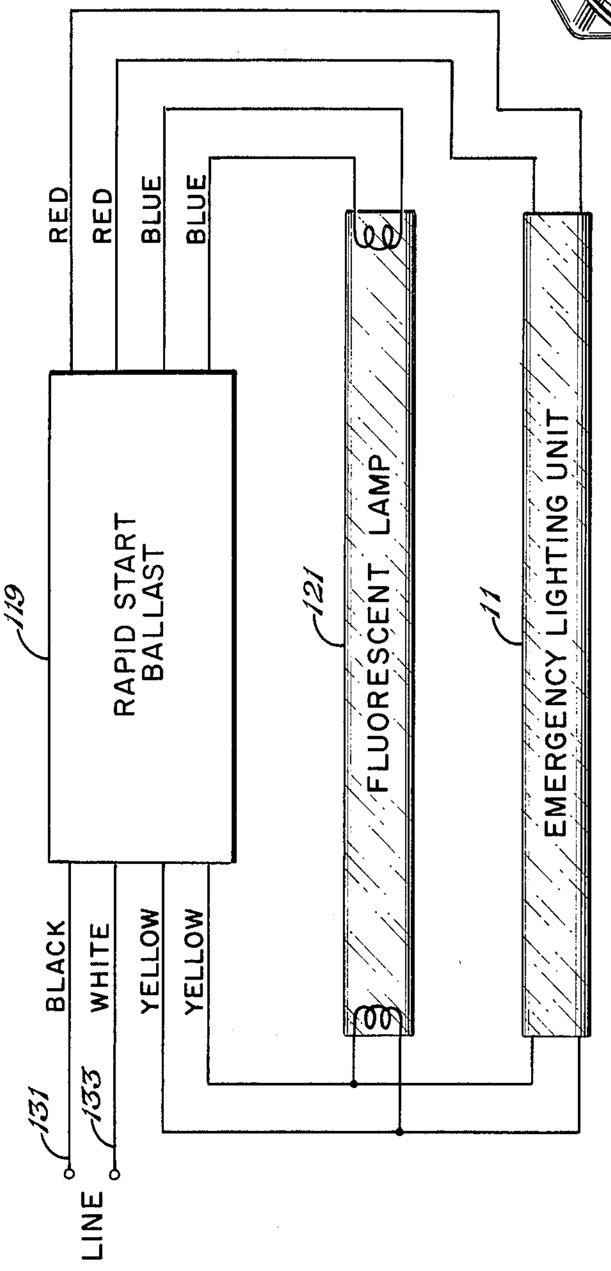
FIG. 9 is a schematic circuit diagram showing an emergency lighting unit 11 connected in a conventional fluorescent light fixture which utilizes a 2 lamp rapid start type ballast and $1\frac{1}{2}$ inch×48 inch 40 watt hot cathode type fluorescent lamps.

In accordance with the present invention, the power for charging the storage batteries is supplied from the conventional rapid start type ballast that is normally present in a lighting fixture that uses 1½ inch×48 inch 40 watt hot cathode type fluorescent lamps. As shown by FIG. 9, for example, such conventional 2 lamp rapid start ballast 119 has a pair of black/white input leads connected to the normal 115 volt alternating current source or "Line", a pair of yellow output leads connected in series with the pins at one end of each of a conventional fluorescent lamp 121 and an emergency lighting unit 11, a pair of blue output leads connected in series with the pins at the other end of the fluorescent lamp 121, and a pair of red output leads connected in series with the pins at the other end of the emergency lighting unit 11. The alternating current voltage across each pair of ballast output leads, yellow, blue, and red is normally in the range of about 3.25 to 4.0 volts, and is normally used for continuously heating the cathodes of the fluorescent lamps that are installed in the light fixture. Thus, there is present across the pins 61, 63 at each end of the emergency lighting unit 11 an alternating current voltage of about 3.25 to 4.0 volts.

In a preferred embodiment of the invention, the storage batteries 39, 43 are cylindrical shaped sealed lead acid battery cells of the "D" size and 2 volt 2.5 ampere hour storage capacity, having a diameter of about 1⅜ inches and a length of about 2½ inches. Suitable such battery cells are manufactured by Gates Energy Products, Inc. of Denver, Colo. These battery cells are rechargeable, are not orientation sensitive, and have suitable physical shape and dimensions. In addition, these cells, from the voltage standpoint are compatible with the available source of charging energy as well as with available light sources; and from the storage capacity standpoint are compatible with the energy dissipation rate of a suitable number of light sources for the requisite length of time.

In a preferred embodiment of the invention, the light sources are specially designed high intensity low voltage miniature lamps 79. These lamps 79 are designed to operate at 4 volts and 200 milliamperes direct current at a temperature of about 2350° Kelvin for a minimum life of about 200 hours. The envelopes are about ⅝ inches long and ¼ inches diameter. The filaments are about ½ inches long and the leads are axial.

The current available from the ballast 119 at the pins 61, 63 at one end of the emergency lighting unit 11 is not sufficient to charge more than two of the batteries 39, 43 at the rate needed for recharging within the requisite time period. Accordingly, two batteries 39, 43 are disposed at each end portion of the emergency lighting unit 11 and each group of two batteries is charged separately from the ballast energy source available at its end of the emergency lighting unit. There is thus available for emergency purposes two direct current power sources, one at each end portion of the emergency lighting unit 11.

Since each direct current power source 39, 43 has a 2.5 ampere hour storage capacity; since each miniature lamp 79 draws about 200 milliamperes of current; and since the length of time the lamps must be energized in a given emergency is at least 1½ hours; each direct current power source 39, 43 can comfortably handle as many as six lamps 79. Accordingly, there are six lamps 79 mounted on each lamp board 19, 21.

The electronics board 23 contains the electronic components and circuitry needed to perform the functions of charging the batteries of each direct current power source 39, 43, monitoring the condition of the batteries and reacting accordingly, and detecting the state of the normal alternating current electric power source and reacting accordingly.

It is convenient for reference purposes to refer to the portion of the electronic circuitry and components of the electronics board 23 that perform the monitoring and detecting functions above-mentioned and the charging of the batteries 39, 43 of one direct current power source as the "A" portion, and to the remaining portion which functions to charge the batteries 39, 43 of the other direct current power source as the "B" portion. The "A" portion of the electronics board 23 is connected to pins 61, 63 ("A" pins) at one end of the emergency lighting unit 11, which is designated the "A" end. The "B" portion of the electronics board 23 is connected to pins 61, 63 ("B" pins) at the other end of the emergency lighting unit 11, which is designated the "B" end. The direct current power supply 39, 43 that is served by the "A" portion of the electronics board 23 is designated the "A" supply and is disposed adjacent the "A" end of the emergency lighting unit 11. The light board 19 that is disposed immediately inboard of the "A" direct current power supply is designated the "A" light board. Similarly, the direct current power supply 39, 43 that is served by the "B" portion is designated the "B" supply and is disposed adjacent the "B" end of the emergency lighting unit 11. The light board 21 that is disposed immediately inboard of the "B" direct current power supply is designated the "B" light board. As viewed in FIG. 1, the left side (portion left of center) of the emergency lighting unit 11 may be considered the "A" side and the right side the "B" side.

Figure 8:
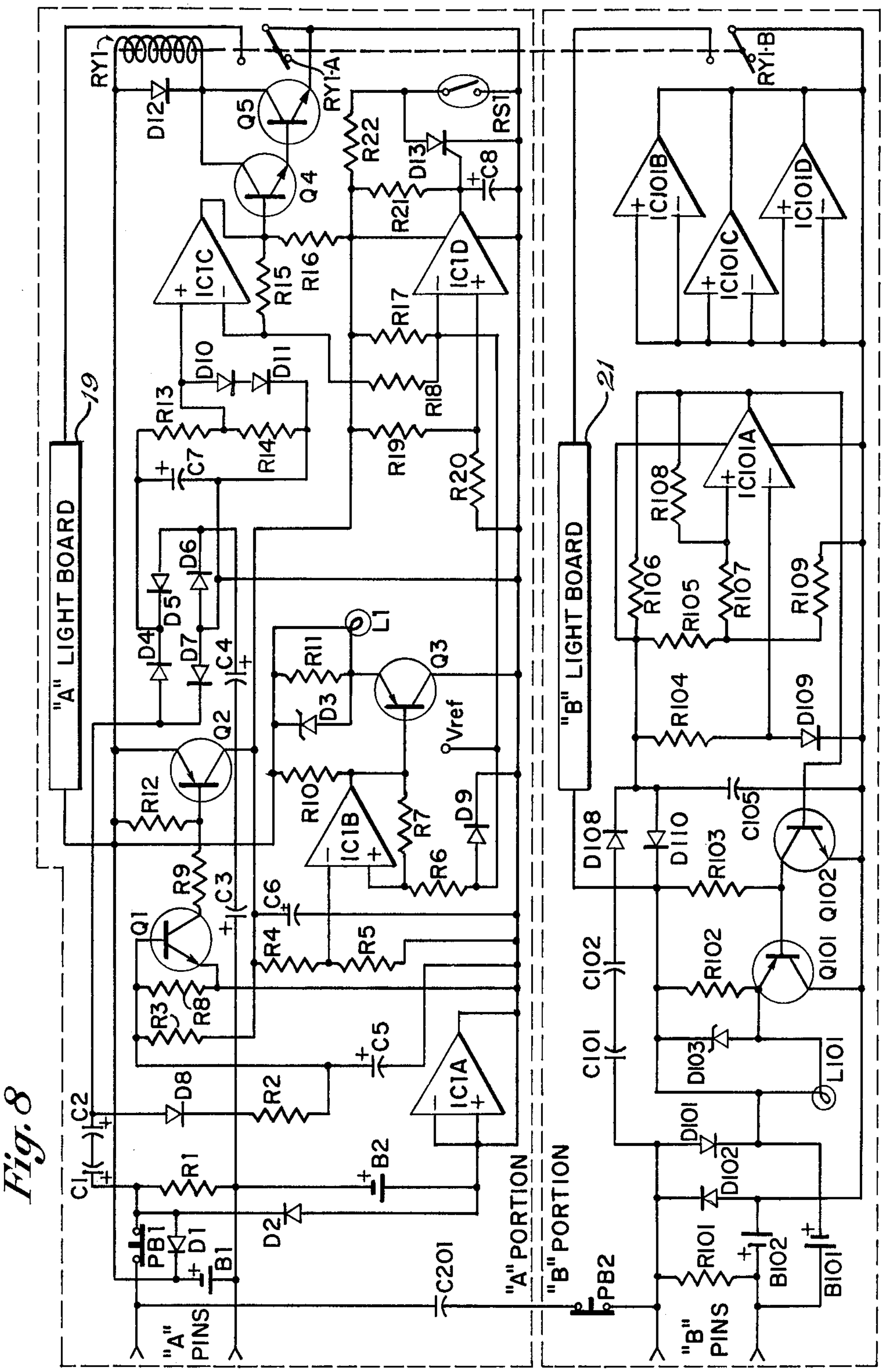
FIG. 8 is a schematic circuit diagram of the electronics board 23.

The electronic components and circuitry for the emergency lighting unit 11, which are associated primarily with the electronics board 23, in accordance with a preferred embodiment of the invention, are shown by FIG. 8 of the drawings. For discussion purposes, the components and circuitry of FIG. 8 can be regarded as being made up of a detector portion, a charger portion for the "A" power supply, a charger portion for the "B" power supply, and a monitor portion.

The detector must detect one of three possible states of the normal alternating current power source or "system power": (1) system power on and lighting circuit (for the group of fluorescent lamp fixtures one or more of which contain an emergency lighting unit 11, controlled by the switch portion of a pulser unit to be hereinafter described) on (the "ON" state), (2) system power on and lighting circuit off (the "OFF" state), and (3) system power off (the emergency or "FAIL" state), and react accordingly. The detector will allow the miniature lamps 79 to be illuminated only during the emergency or "FAIL" state. During the "ON" state, the power applied to the ballast 119 keeps the detector reset. During the "OFF" state, the detector is kept reset by signals from the pulser unit 123 (see FIGS. 10 and 11), which applies periodic controlled energy pulses to the lighting circuit. Only upon actual system power failure will the detector set and activate the miniature lamps 79.

The charger is a shunt regulator that limits the maximum voltage across the output of batteries of the respective "A" supply ($B_1$ and $B_2$ in FIG. 8) and "B" supply ($B_{101}$ and $B_{102}$ in FIG. 8) to 4.7 volts. The input voltage to the "A" pins and "B" pins of the emergency lighting unit 11 from the conventional ballast 119 is approximately 3.7 volts a.c., which, when rectified, gives approximately 5.2 volts d.c. Rather than waste this excess energy in the form of heat, the surplus power (due to the difference between 5.2 volts and the battery output voltage) is utilized to light a respective pilot lamp $L_1$, $L_{101}$. The respective pilot light's degree of brilliance gives a visual indication of the state of battery charge. During the first part of the recharge cycle, when the batteries are deeply discharged, the respective charger applies most of the incoming energy to recharge the batteries and uses only a small portion of the current to illuminate the respective pilot lamp $L_1$, $L_{101}$ (which will consequently be dim). As the batteries reach full charge, the charger diverts most of the incoming energy to the respective pilot lamp (which increases in brilliance), protecting the batteries from overcharging. The batteries are protected from discharge through the shunt device during the "OFF" state by a transistor $Q_3$ that is conductive only when system power is applied to the fluorescent lamp fixture.

The monitor circuit monitors the "A" supply battery output voltage during the emergency state and, when this battery output voltage finally drops to 3.2 volts, the monitor disconnects both the miniature lamps 79 ("A" and "B" light boards 19, 21) and the electronic components and circuitry from both the "A" supply and "B" supply batteries, thus protecting the batteries from a destructive deep discharge. This mode, which can be referred to as the "shutdown mode" may be manually achieved by external actuation of a magnetic reed switch RS1 which is mounted on the electronics board 23. The monitor also contains a "kick-start" circuit that re-activates a shutdown emergency lighting unit 11 upon application of system power to the emergency lighting unit. This kick-starter also is used to activate the shunt regulator in the respective charger.

The detector is comprised of ¼ of a LM339 quad voltage comparitor (IC1C in FIG. 8). The non-inverting input of IC1C is connected to $V_{ref}$ by resistor $R_{18}$. $V_{ref}$ is obtained at the junction of $R_{17}$ and diode $D_9$, and is a constant 700 millivolts over the battery voltage range of interest, which is 4.7 V to 3.2 V. The inverting input of IC1C is fed by a capacitor isolated bridge rectifier ($C_1$-$C_4$, $D_4$-$D_7$), and is low pass filtered and limited by $C_7$, $R_{13}$, $R_{14}$, $D_{1O}$, and $D_{11}$. The open collector output is pulled up by $R_{16}$ and is fed to the base of transistor $Q_4$, the relay predriver and transistor $Q_5$, the relay driver. $R_{15}$ is a feedback resistor to stabilize the operation of IC1C. In both the system power "ON" and "OFF" states, the inverting input is positive with respect to the non-inverting input resulting in IC1C's output turning on and clamping the base of $Q_4$ at 0.3 volts, turning it off. When the re-set signals cease to be present (the system power emergency state or "FAIL"), the inverting input goes negative with respect to the non-inverting input, turning IC1C's output off, allowing the base of $Q_4$ to rise to 1.4 volts, saturating $Q_4$ and pulling in the lamp relay RY1. RY1 is a DPST relay, using a separate set of contacts RY1-A and RY1-B to energize the respective "A" and "B" light boards 19, 20. $D_{12}$ is a kickback supression diode, used to reduce the inductive kick generated when the relay RY1 is turned off.

The charger for the "A" supply is composed of a fullwave freewheeling voltage doubler ($D_1$ and $D_2$) and a voltage regulator to limit the maximum charge level to the batteries. The voltage regulator is made from IC1B, which is ¼ of IC1 which is an LM339 quad voltage comparitor, and resistors $R_4$, $R_5$, $R_6$, $R_7$, $R_{10}$, and $D_9$. The reference voltage is generated across $D_9$ and is sampled at the non-inverting input of IC1B by $R_6$. $R_7$ is a feedback resistor used to provide a small amount of hysteresis. The battery voltage is sampled through the voltage divider $R_4$ and $R_5$. $R_{10}$ is the pullup resistor for IC1B's open collector output. Lamp $L_1$ is the pilot light for the "A" supply. As the input voltage to the batteries climbs above the preset maximum, IC1B turns on, $Q_3$ conducts, and the excess energy is dissipated in $L_1$. $R_{11}$ and $D_3$ are used to limit the maximum energy applied to the pilot lamp. The "B" supply has a charger that is similar in design to the "A" supply charger. Diodes $D_{101}$ and $D_{102}$ form the freewheeling voltage doubler. $L_{101}$, $D_{103}$, $R_{102}$, $R_{103}$, and $Q_{101}$ are similar in function to $L_1$, $D_3$, $R_{11}$, $R_{10}$, and $Q_3$ respectively. $R_{106}$ is the pullup resistor for IC101A's output to driver transistor $Q_{102}$. $R_{107}$ and $R_{108}$ provide the feedback stabilization to the non-inverting input to IC101A which monitors the battery voltage as divided by $R_{105}$ and $R_{109}$. The reference voltage is generated by $R_{104}$ and $D_{109}$. Rather than drain the batteries to power the IC, the minimal current drain is provided by a capacitor isolated half wave rectifier ($C_{101}$, $C_{102}$, $D_{108}$, and $C_{105}$). $D_{110}$ is a clamp diode that assures that the voltage provided by the capacitor isolated half wave rectifier is greater than the battery voltage. It is apparent from the foregoing that "A" supply batteries and also the "B" supply batteries 39, 43 are charged in parallel but are connected to the respective "A" and "B" light boards 19, 21 in series.

The monitor circuit is designed around a single voltage comparitor section of IC1. During the system power emergency or "FAIL" state, the batteries may eventually fully discharge, indicated by the "A" supply output voltage reaching 3.2 volts. When the "A" supply (batteries $B_1$ and $B_2$ in FIG. 8) voltage drops to 3.2 volts, the inverting input of IC1D (as fed from $R_{19}$ and $R_{20}$) goes negative with respect to the noninverting input, the output cuts off, and current through pullup resistor $R_{21}$ fires SCR $D_{13}$. This heavy current drain lowers the base voltage of $Q_1$, shutting down $Q_2$ (through $R_9$) and hence the electronic components and circuitry. $Q_2$ is held cut off at that time by pulldown resistor $R_{12}$. When power is reapplied, the kick-start circuit (comprised of $R_2$, $R_3$, $R_8$, $C_5$, and $D_8$) supplies base current to $Q_1$ which then turns $Q_2$ back on and powers up the emergency lighting unit 11. $R_{22}$ is a current limiting resistor to protect $D_{13}$ and $Q_2$. The shutdown mode may be manually achieved by magnetically activating reed switch RS1. Capacitor $C_8$ is a lowpass filter to keep momentary transients from shutting the emergency lighting unit 11 down.

The remaining parts of the electronic components and circuitry shown by FIG. 8 are utilized as follows. $R_1$ (and $R_{101}$) are static bleed-off resistors that keep the emergency lighting unit 11 from being accidentally activated during storage and transport. $C_6$ is a filter capacitor. $C_{201}$ is the transfer reactance capacitor. This capacitor will allow the ballast 119 to supply power to illuminate the standard fluorescent lamp 121 in the same fixture as the emergency lighting unit 11. PB2, which is safety switch 115 of FIG. 2, is a push button switch that is used to disconnect $C_{201}$ during transport and installation and in cases of installation of the emergency lighting unit 11 in a single fluorescent lamp fixture. There is provided an internally threaded cap 135 (see FIG. 2) which when screwed onto mating threads at the base of the actuator of safety switch 115 (PB2), will hold it in the open position. When the cap 135 is removed, the safety switch 115 (PB2) assumes its normally closed position. PB1, which is the test switch 117 of FIG. 2, is normally closed. When PB1 is depressed to the open position, the input to the electronic circuitry and components of the electronics board 23 is opened, which simulates the power system emergency or "FAIL" state, causing the detector to set, so that the relay RY1 will be energized, resulting in the illumination of the light boards 19, 21. LM339 quad voltage comparitor sections IC1A, IC101B, IC101C, and IC101D are shown in FIG. 8 but are not used.

Figure 10:
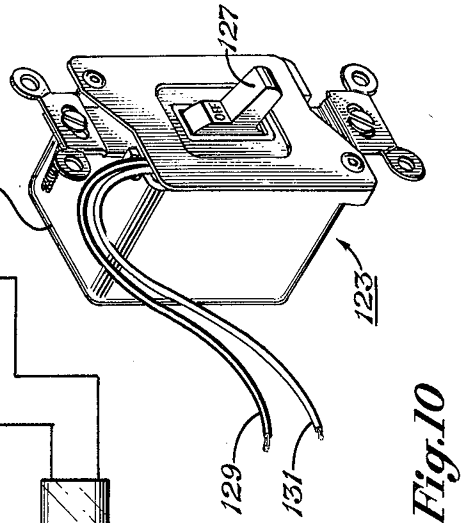
FIG. 10 is a schematic perspective view showing a pulser unit which may be utilized in some embodiments of the present invention.

The pulser unit 123, as shown by FIG. 10 is designed to replace a standard switch, such as a wall switch of the type normally used to switch on or off a conventional fluorescent light fixture or a group of same. The pulser unit has a housing 125 which contains both the switch portion 127 and the electronic circuitry and components necessary for the generation of the requisite pulses. The pulser unit 123 incorporates the usual means for mounting a switch in a wall box, and has two leads 129, 131 for connection to the lighting circuit in the usual manner. The black lead 131 of the ballast 119 (see FIG. 9) would normally be connected to the lead 131 of the switch 127 and the white lead 133 of the ballast 119 would normally be connected to the common lead (not shown) of the normal alternating current electric power source.

The pulses that are generated by the pulser unit must be of magnitude sufficient to permit proper functioning of the detector portion of the electronics board 23 and yet not cause flashing of the fluorescent lamp 121 that is present in the fixture with the emergency lighting unit 11. Also, the pulser must function as a true "two wire device" in that it must apply its output pulses to the same terminals 129, 131 that it receives its operating power from. These constrictions present problems that are resolved by the present invention.

Figure 11:
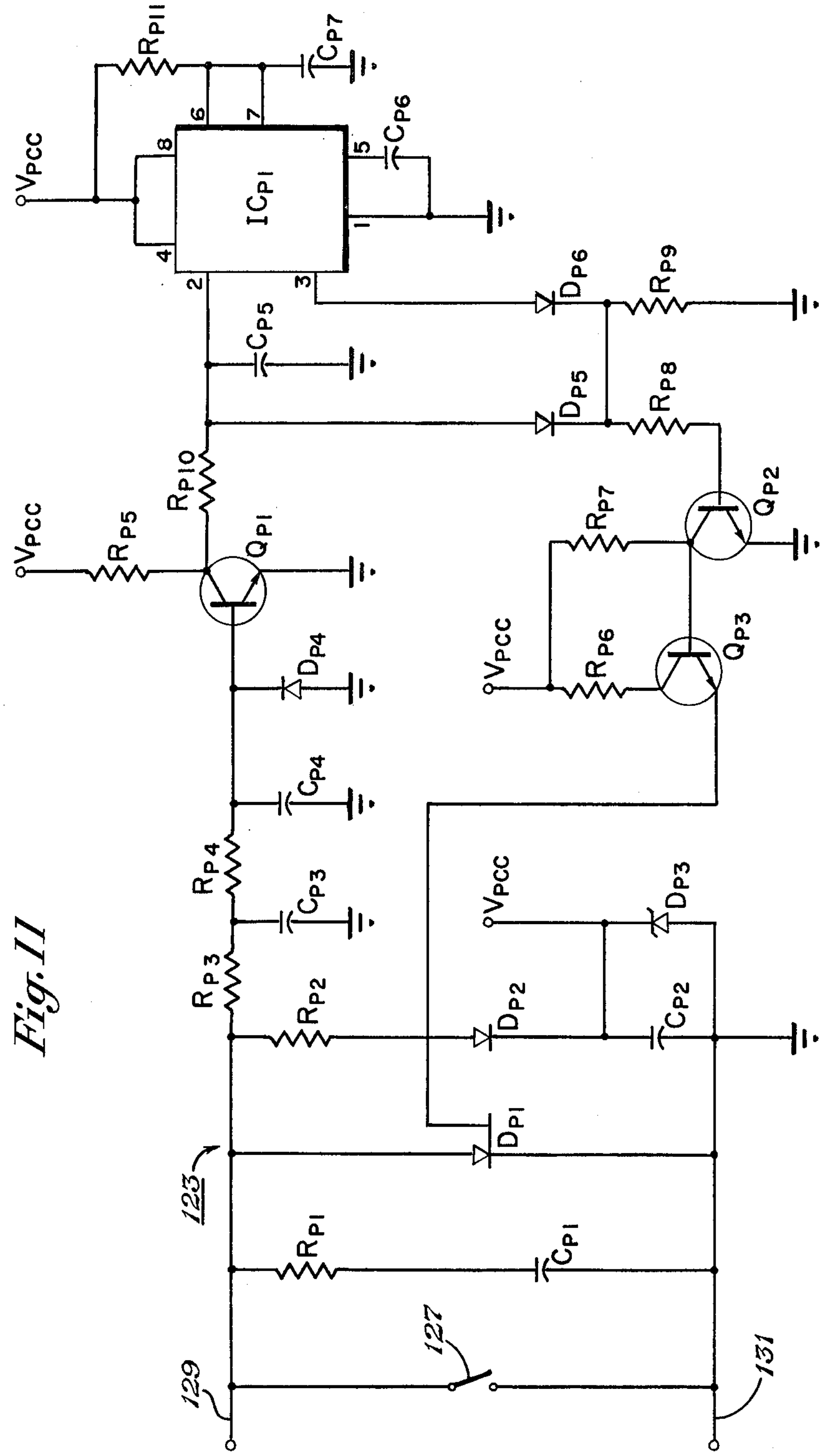
FIG. 11 is a schematic circuit diagram of the pulser unit of FIG. 10.

The electronic circuitry and components of the pulser unit 123 are shown by FIG. 11 of the drawings. When the system power is in the "ON" state, the switch portion 127 is closed, shunting the leads 129, 131 so that the pulser unit 123 receives no power and consequently does not operate. However, at the same time, system power is applied to the detector portion of the electronics board 23, keeping it reset. When the system power is in the "OFF" state, the switch portion 127 is open and the pulser unit 123 does receive power and will operate, as will be presently explained, to generate periodic pulses that are transmitted via the lighting circuit to the detector portion of the electronics board 23, keeping it re-set. When the system power is in the emergency or "FAIL" state, no power is present at pulser unit leads 129, 139 and so no pulses are generated. The absence of both system power and pulses from the pulser unit 123 will cause the detector portion of the electronics board 23 to set, causing actuation of relay RY1 to cause illumination to the light boards 19, 21 of the emergency lighting unit 11.

The pulses that are generated by the pulser unit 123 are actually a selected portion of the half waves of the 60 Hertz waveform of the system power which are passed by a high speed solid state switch. The 60 Hertz waveform of the system power is applied to a delay network which feeds a zero crossing detector. The output of the zero crossing detector is fed both to one input of an "OR" gate and the input of a pulse generator the output of which is fed to the other input of the "OR" gate. The output of the "OR" gate is connected to trigger or fire the high speed solid state switch. It has been found that the accuracy of the firing of the high speed solid state switch must be within about a 3 degree window (of a suitable portion of a 60 Hertz half wave) in order to provide enough power for the detector to function properly and yet not cause flashing of a fluorescent lamp. The pulser unit of the present invention not only meets all of the requisite criteria but does so without the necessity of using any expensive special purpose components.

Referring now particularly to FIG. 11, it is seen that the electronic circuitry and components of the pulser unit 123 are connected in shunt with the switch portion 127. When the switch portion 127 is open, the 60 Hertz waveform present at leads 129, 131 is attenuated and phase shifted by the delay network consisting of $R_{P3}$, $R_{P4}$, $C_{P3}$, and $C_{P4}$. Transistor $Q_{P1}$ acts as a precision zero crossing detector by turning on when the base-emitter voltage exceeds 0.7 volts. $R_{P5}$ acts as a collector load resistor. $R_{P10}$ and $C_{P5}$ act as an input trigger wave shaper for the pulse generator or PRR timer made from $IC_{P1}$, $R_{P11}$, $C_{P6}$, and $C_{P7}$. $IC_{P1}$ is an NE555 connected as a one-shot multivibrator with a period of 300 milliseconds. The output of the pulse generator is "ORed" with the output of the zero crossing detector in an "OR" gate made up of diodes $D_{P5}$ and $D_{P6}$, inverted by $Q_{P2}$, $R_{P7}$, and $R_{P8}$, and drives high speed solid state switch SCR $D_{P1}$ through $R_{P6}$ and $Q_{P3}$. $R_{P9}$ is a bias resistor for the inverter. High speed solid state switch $D_{P1}$ is fired by this network periodically at intervals of 300 milliseconds and at a selected number of electrical degrees (preferrably about 155) from the incoming zero crossing, thus producing low-energy, highly harmonic pulses. $R_{P1}$ and $C_{P1}$ constitute a conventional transient snubber network used to protect $D_{P1}$. The power supply portion of the pulser unit comprises $R_{P2}$, $D_{P2}$, $D_{P3}$, and $C_{P2}$. $D_{P4}$ is a voltage protect diode for $Q_{P1}$. $V_{PCC}$ designates common power supply voltage points.

Although the emergency lighting unit 11 has been shown and described in a preferred embodiment particularly as applied to substitute for a conventional hot cathode type fluorescent lamp of the $1\frac{1}{2}$ inch by 48 inch 40 watt size in a conventional fixture incorporating a two lamp rapid start ballast, it can be utilized in various aspects of the present invention in other applications. For example, it can be adapted to substitute for other sizes of hot cathode type fluorescent lamps, such as the 24 inch 20 watt and 36 inch 30 watt sizes. Also, for example, it can be adapted for use in single lamp, three lamp or four lamp fixtures which incorporate respective single lamp, three lamp or four lamp rapid start ballasts.

As has been hereinbefore mentioned, a transfer reactance capacitor ($C_{201}$ in FIG. 8) is provided so as to permit the other fluorescent lamp or lamps in the fixture to operate normally when an emergency lighting unit 11 is installed in the fixture. The emergency lighting unit 11 will operate regardless of the condition or even absence of one or more of the fluorescent lamps in the fixture. The safety switch 115 (PB2 of FIG. 8) actually serves three purposes. First, when the cap 135 is in place so PB2 is held open, the emergency lighting unit 11 may be installed and will work normally in a single lamp fixture, in which case the cap 135 is not removed after installation. Second, the cap 135 is in place so PB2 is held open during installation of the emergency lighting unit 11, so as to avoid accidental electrical shock to the installer. Third, when the emergency lighting unit 11 is installed in a fixture designed to receive at least two fluorescent lamps, the cap 135 is removed after installation so that PB2 will be closed to connect the transfer reactance capacitor ($C_{201}$ in FIG. 8) into the circuit.

It should be noted that removal of the emergency light unit 11 from the fixture has the same effect as does the opening of the test switch PB1; that is, it simulates the power system emergency or "FAIL" state, resulting in illumination of the light boards 19, 21. This means that if for any reason during an emergency an emergency lighting unit 11 becomes dislodged from its fixture, its light board 19, 21 will continue to be illuminated. Also, the emergency lighting unit 11 can, if desired, be deliberately removed from its fixture and then used as a portable emergency light.

The design of the emergency lighting unit 11 is such that it can be activated to the shutdown mode by manual means, which in the preferred embodiment comprises the normally open magnetically actuable reed switch RS1. Once in the shutdown mode, the emergency lighting unit 11 can only be returned to its normal operative state by installing it in an applicable fluorescent light fixture so that it will receive its normal power from the associated rapid start ballast, activating the kick-start circuit means. This means that after manufacture and testing, a completed emergency lighting unit 11 with all batteries installed and fully charged can be activated to the shutdown mode by passing a small magnet near the reed switch RS1 to momentarily close it, and then be shipped and handled prior to installation without any likelihood of accidentally or otherwise causing energization of relay RY1 to illuminate the light boards and discharge the batteries. At the same time, the emergency lighting unit 11 will be automatically returned to its normal operative state by the act of installation.

As previously herein stated, the miniature lamps 79 are preferably of special design. The filaments are non-wound, are axial with respect to the lamp envelope and have no intermediate supports. The minature lamps 79 may be referred to as being of a long, axial, non-wound filament type with the filament having no intermediate support. The term long filament in this context would be within the range of about $\frac{3}{8}$ to $\frac{5}{8}$ inches. It is also preferable that the miniature lamps 79 be disposed in one or more linear arrays the central axes of which are parallel to the longitudinal axis of the emergency lighting unit 11 housing. Thus, the lamps as shown in FIGS. 1 and 2 are disposed in two linear arrays on light boards 19, 21, with the central axes of the arrays being actually substantially coincident with each other and parallel and adjacent to the longitudinal axis of the emergency lighting unit 11 housing. The miniature lamps 79 of each array need not be staggered as shown in FIGS. 1 and 2 but can be aligned so that the longitudinal axes of the filaments are substantially coincident. When the emergency lighting unit 11 utilizes one or more linear arrays of miniature lamps 79 of the long, axial, non-wound filament type as above-described and the miniature lamps 79 are illuminated under emergency conditions involving heavy smoke, they can not only be seen but can provide an important sense of orientation and direction to an observer.

As previously herein described and as shown in the drawings (see FIG. 5) certain connections are made via through conductors or traces 81 on the light boards 19, 21. It will, of course, be understood that such connections could be made instead via insulated wire conductors or cables.

The pulser unit 123, instead of incorporating a single pole switch 127 as shown in FIG. 11, can incorporate a 3-way type switch, in which case a pulser unit will be installed at each normal 3-way switch location. Although in the preferred embodiment, the pulser unit utilizes an "OR" gate, it is apparent that it could be designed to instead utilize other types of logic gates.

The foregoing disclosure and the showings made in the drawings are merely illustrative of the principles of this invention and are not to be interpreted in a limiting sense.

We claim:

1. An emergency lighting unit to be substituted for a conventional hot cathode type fluorescent lamp in a conventional fixture for receiving such fluorescent lamp and including a conventional rapid start ballast connected to supply cathode heater voltage for such fluorescent lamp, said emergency lighting unit comprising:

a. an elongated housing of length substantially equal to that of a conventional said fluorescent lamp; with said housing having mounted at its ends connection pins comparable to the bi-pin base ends of such fluorescent lamp; with said housing having transverse dimensions providing sufficient clearance to permit substitution of said emergency lighting unit for a said fluorescent lamp in said conventional fixture;

b. a direct current power source comprising one or more rechargeable batteries contained within said housing;

c. a plurality of high intensity low voltage miniature lamps to be powered during emergencies by said direct current power source, contained within said housing;

d. electronic circuitry and components contained within said housing and utilizing power from said ballast supplied to said connection pins for normally heating a cathode of said fluorescent lamp, for charging said battery or batteries, monitoring the condition of said battery or batteries and reacting accordingly, detecting the state of the normal alternating current electric power source responsive to signals present at said connection pins and reacting accordingly.

2. The device as in claim 1 wherein said fluorescent lamp is a 1½ inch by 24 inch 20 watt size.

3. The device as in claim 1 wherein said fluorescent lamp is a 1½ inch by 36 inch 30 watt size.

4. The device as in claim 1 wherein said fluorescent lamp is a 1½ inch by 48 inch 40 watt size.

5. The device as in any one of claims 1, 2, 3, or 4 wherein said battery or batteries are of the sealed type and said miniature lamps are connected in parallel.

6. The device as in claim 5 wherein said battery or batteries are of the sealed lead acid type.

7. The device as in claim 5 wherein said miniature lamps are disposed in one or more linear arrays the central axes of which are parallel to the longitudinal axis of said elongated housing.

8. The device as in claim 6 wherein said battery or batteries are rated at 2 volts and 2.5 ampere hours capacity; wherein said electronic circuitry and components includes means for charging said battery or battery or batteries in parallel and connecting them to said miniature lamps in series.

9. The device as in claim 7 wherein said miniature lamps are of a long, axial, non-wound filament type with the filament having no intermediate support.

10. The device as in claim 8 wherein each said miniature lamp array is mounted on an elongated board having a light reflecting surface.

11. The device as in claim 5 wherein said signals present at said connection pins comprise periodic pulses and said detecting portion of said electronic circuitry and components will react to connect said emergency power source to said miniature lamps upon the absence of a predetermined number of consecutive said periodic pulses.

12. An emergency lighting unit to be substituted for a conventional hot cathode type fluorescent lamp in a conventional fixture for receiving such fluorescent lamp and including a conventional rapid start ballast connected to supply cathode heater voltage for such fluorescent lamp, said emergency lighting unit comprising;

a. an elongated generally cylindrical housing of length and diameter substantially equal to that of a conventional said fluorescent lamp; with said housing having mounted at its ends connection pins comparable to the bi-pin base ends of such fluorescent lamp;

b. a direct current power source comprising at least two rechargeable sealed cylindrical shaped "D" size battery cells contained within said housing;

c. a plurality of high intensity low voltage miniature lamps to be powered during emergencies by said direct current power source, contained within said housing;

d. electronic circuitry and components contained within said housing and utilizing power from said ballast supplied to said connection pins for normally heating a cathode of said fluorescent lamp, for charging said batteries, monitoring the condition of said batteries and reacting accordingly, detecting the state of the normal alternating current electric power source responsive to signals present at said connection pins and reacting accordingly.

13. The device as in claim 12 wherein said fluorescent lamp is a 1½ inch by 24 inch 20 watt size.

14. The device as in claim 12 wherein said fluorescent lamp is a 1½ inch by 36 inch 30 watt size.

15. The device as in claim 12 wherein said fluorescent lamp is a 1½ inch by 48 inch 40 watt size.

16. The device as in any one of claims 12, 13, 14, or 15 wherein said battery or batteries are of the sealed type and said miniature lamps are connected in parallel.

17. The device as in claim 16 wherein said battery or batteries are of the sealed lead acid type.

18. The device as in claim 16 wherein said miniature lamps are disposed in one or more linear arrays the central axes of which are parallel to the longitudinal axis of said elongated housing.

19. The device as in claim 17 wherein said battery or batteries are rated at 2 volts and 2.5 ampere hours capacity; wherein said electronic circuitry and components includes means for charging said battery or batteries in parallel and connecting them to said miniature lamps in series.

20. The device as in claim 18 wherein said miniature lamps are of a long, axial, non-wound filament type with the filament having no intermediate support.

21. The device as in claim 19 wherein each said miniature lamp array is mounted on an elongated board having a light reflecting surface.

22. The device as in claim 16 wherein said signals present at said connection pins comprise periodic pulses and said detecting portion of said electronic circuitry and components will detect failure of the normal alternating current power source responsive to the absence of a predetermined number of consecutive said periodic pulses.

23. An emergency lighting unit to be substituted for a conventional hot cathode type fluorescent lamp in a conventional fixture for receiving such fluorescent lamp and including a conventional rapid start ballast connected to supply cathode heater voltage for such fluorescent lamp, said emergency lighting unit comprising:

a. an elongated generally cylindrical housing of length and diameter substantially equal to that of a conventional said fluorescent lamp; with said housing having mounted at its "A" end and its "B" end connection pins comparable to the bi-pin base ends of such fluorescent lamp;

b. a direct current power source comprising four rechargeable sealed cylindrical shaped "D" size battery cells contained within said housing and arranged as an "A" power supply of two cells and a "B" power supply of two cells;

c. a plurality of high intensity low voltage miniature lamps to be powered during emergencies by said direct current power source, contained within said housing and arranged in two groups as an "A" light source and a "B" light source, with a substantially equal number of said miniature lamps in each group;

d. electronic circuitry and components contained within said housing and utilizing power from said ballast supplied to said "A" end connection pins for normally heating a cathode of said fluorescent lamp, for charging the batteries of said "A" power supply, monitoring the condition of said batteries and reacting accordingly, detecting the state of the normal alternating current electric power source responsive to signals present at said "A" connection pins and reacting upon failure of the normal alternating current power source to connect the "A" power supply to the "A" light source and the "B" power supply to the "B" light source;

e. electronic circuitry and components contained within said housing and utilizing power from said ballast supplied to said "B" end connection pins for normally heating a cathode of said fluorescent lamp, for charging the batteries of said "B" power supply.

24. The device as in claim 23 wherein said fluorescent lamp is a $1\frac{1}{2}$ inch by 36 inch 30 watt size.

25. The device as in claim 23 wherein said fluorescent lamp is a $1\frac{1}{2}$ inch by 48 inch 40 watt size.

26. The device as in any one of claims 23, 24, or 25 wherein said batteries are of the sealed type and said miniature lamps are connected in parallel.

27. The device as in claim 26 wherein said batteries are of the sealed lead acid type.

28. The device as in claim 27 wherein said miniature lamps of said "A" light source and said "B" light source are disposed in respective linear arrays the central axes of which are parallel to the longitudinal axis of said elongated housing.

29. The device as in claim 27 wherein said batteries are rated at 2 volts and 2.5 ampere hours capacity; wherein said electronic circuitry and components includes means for charging said battery or batteries in parallel and connecting them to said miniature lamps in series.

30. The device as in claim 28 wherein said miniature lamps are of a long, axial, non-wound filament type with the filament having no intermediate support.

31. The device as in claim 30 wherein there is additionally provided a respective pilot lamp for each said power supply and the energy available from said ballast in excess of that required at a given time for charging the batteries of a said power supply is utilized to power a respective said pilot lamp, whereby the degree of brilliance of said pilot lamp provides a visual indication of the state of charge of the batteries of said respective power supply.

32. The device as in claim 29 wherein said "A" light source and "B" light source are each mounted on a respective elongated board having a light reflecting surface.

33. The device as in claim 26 wherein said signals present at said connection pins comprise periodic pulses and said detecting portion of said electronic circuitry and components will detect failure of the normal alternating current power source responsive to the absence of a predetermined number of consecutive said periodic pulses.

34. The device as in claim 33 wherein the state of said normal alternating current power source is either "ON", "OFF", or "FAIL", and the detecting portion of said electronic circuitry and components comprises means for maintaining the detector in the re-set condition for the "ON" and "OFF" states and in the set condition for the "FAIL" state.

35. The device as in claim 34 wherein there is additionally provided in said electronic circuitry and components a normally closed test switch and the opening of said test switch simulates the "FAIL" state to cause illumination of said light boards for test purposes.

36. The device as in claim 34 wherein said detecting portion will automatically upon removal from a said fixture assume the set condition to cause illumination of said light boards.

37. The device as in claim 33 wherein said periodic pulses are generated by a pulser unit.

38. The device as in claim 23 wherein the monitoring portion of said electronic circuitry and components comprises electrical means for activating said emergency lighting unit to the shutdown mode upon the batteries of the associated power supply reaching a predetermined voltage level due to discharge.

39. The device as in claim 38 wherein there is additionally provided manual means for activating said emergency lighting unit to the shutdown mode.

40. The device as in claim 39 wherein said manual means comprises a normally open magnetically actuable reed switch.

41. The device as in claim 39 wherein said electronic components and circuitry comprises means for causing said emergency lighting unit to return from the shutdown mode to its normal operative state only when said emergency lighting unit is installed in a said conventional fixture so as to receive power from said rapid start ballast

42. The device as in claim 41 wherein said means for causing said emergency lighting unit to return from its shutdown mode to its normal operative state comprises kickstart circuit means.

43. The device as in claim 23 wherein a transfer reactance capacitor is connected between one of said "A" connection pins and the corresponding "B" connection pin.

44. The device of claim 23 wherein a transfer reactance capacitor is connected in series with a normally closed safety switch between one of said "A" connection pins and the corresponding "B" connection pin.

45. The device of claim 44 wherein there is additionally provided removable means for retaining said safety switch in the open position.

46. An emergency lighting unit to be substituted for a conventional $1\frac{1}{2}$ inch by 48 inch 40 watt hot cathode type fluorescent lamp in a conventional fixture for receiving such fluorescent lamp and including a conventional rapid start ballast connected to supply cathode heater voltage for such fluorescent lamp, said emergency lighting unit comprising:

a. an elongated generally cylindrical housing of length and diameter substantially equal to that of a conventional said fluorescent lamp; with said housing having mounted at its "A" end and its "B" end connection pins comparable to the bi-pin base ends of such fluorescent lamp;
b. a direct current power source comprising four rechargeable sealed cylindrical shaped "D" size battery cells contained within said housing and arranged as an "A" power supply of two cells disposed adjacent the "A" end of said housing and a "B" power supply of two cells disposed adjacent the "B" end of said housing;
c. a plurality of high intensity low voltage miniature lamps to be powered during emergencies by said direct current power source, contained within said housing and arranged in two groups as an "A" light source and a "B" light source, with a substantially equal number of said miniature lamps in each group with the lamps of said "A" light source being mounted on an "A" light board which is disposed in said housing immediately inboard of said "A" power supply and with the lamps of said "B" light source being mounted on a "B" light board which is disposed in said housing immediately inboard of said "B" power supply;
d. electronic circuitry and components contained within said housing and utilizing power from said ballast supplied to said "A" end connection pins for normally heating a cathode of said fluorescent lamp, for charging the batteries of said "A" power supply, monitoring the condition of said batteries and reacting accordingly, detecting the state of the normal alternating current electric power source responsive to signals present at said "A" connection pins and reacting upon failure of the normal alternating current power source to connect the "A" power supply to the "A" light source and the "B" power supply to the "B" light source, with said electronic circuitry and components comprising an electronics board disposed in said housing between said lamp boards;

47. The device as in claim 46 wherein said fluorescent lamp is a $1\frac{1}{2}$ inch by 36 inch 30 watt size.

48. The device as in claim 46 wherein said fluorescent lamp is a $1\frac{1}{2}$ inch by 48 inch 40 watt size.

49. The device as in any one of claims 46, 47, or 48 wherein said batteries are of the sealed type and said miniature lamps are connected in parallel.

50. The device as in claim 49 wherein said batteries are of the sealed lead acid type.

51. The device as in claim 50 wherein said miniature lamps of said "A" light source and said "B" light source are disposed in respective linear arrays the central axes of which are parallel to the longitudinal axis of said elongated housing.

52. The device as in claim 50 wherein said batteries are rated at 2 volts and 2.5 ampere hours capacity; wherein said electronic circuitry and components includes means for charging said battery or batteries in parallel and connecting them to said miniature lamps in series.

53. The device as in claim 51 wherein said miniature lamps are of a long, axial, non-wound filament type with the filament having no intermediate support.

54. The device as in claim 52 wherein said "A" light source and "B" light source are each mounted on a respective elongated board having a light reflecting surface.

55. The device as in claim 49 wherein said signals present at said connection pins comprise periodic pulses and said detecting portion of said electronic circuitry and components will detect failure of the normal alternating current power source responsive to the absence of a predetermined number of consecutive said periodic pulses.

56. The device as in claim 46 wherein the monitoring portion of said electronic circuitry and components comprises electrical means for activating said emergency lighting unit to the shutdown mode upon the batteries of the associated power supply reaching a predetermined voltage level due to discharge.

57. The device as in claim 56 wherein there is additionally provided manual means for activating said emergency lighting unit to the shutdown mode.

58. The device as in claim 57 wherein said manual means comprises a normally open magnetically actuable reed switch.

59. The device as in claim 57 wherein said electronic components and circuitry comprises means for causing said emergency lighting unit to return from the shutdown mode to its normal operative state only when said emergency lighting unit is installed in a said conventional fixture so as to receive power from said rapid start ballast.

60. The device as in claim 59 wherein said means for causing said emergency lighting unit to return from its shutdown mode to its normal operative state comprises kickstart circuit means.

61. The device as in claim 53 wherein there is additionally provided a respective pilot lamp for each said power supply and the energy available from said ballast in excess of that required at a given time for charging the batteries of a said power supply is utilized to power a respective said pilot lamp, whereby the degree of brilliance of said pilot lamp provides a visual indication of the state of charge of the batteries of said respective power supply.

62. The device as in claim 55 wherein the state of said normal alternating current power source is either "ON", "OFF", or "FAIL", and the detecting portion of said electronic circuitry and components comprises means for maintaining the detector in the re-set condition for the "ON" and "OFF" states and in the set condition for the "FAIL" state.

63. The device as in claim 55 wherein said periodic pulses are generated by a pulser unit.

64. The device as in claim 62 wherein there is additionally provided in said electronic circuitry and components a normally closed test switch and the opening of said test switch simulates the "FAIL" state to cause illumination of said light boards for test purposes.

65. The device as in claim 62 wherein said detecting portion will automatically upon removal from a said fixture assume the set condition to cause illumination of said light boards.

66. The device as in claim 46 wherein a transfer reactance capacitor is connected between one of said "A" connection pins and the corresponding "B" connection pin.

67. The device of claim 46 wherein a transfer reactance capacitor is connected in series with a normally closed safety switch between one of said "A" connection pins and the corresponding "B" connection pin.

68. The device of claim 67 wherein there is additionally provided removable means for retaining said safety switch in the open position.

69. The device as in claim 49 wherein said elongated generally cylindrical housing comprises a battery compartment at each end portion joined to an intermediate cylinder portion, with each battery compartment being made up of complimentary halves the abutting surfaces of which when assembled lie substantially in a plane which contains the emergency lighting unit longitudinal axis.

70. The device as in claim 69 wherein said battery compartments are injection molded of an opaque plastic material.

71. The device as in claim 70 wherein said plastic material is polyphenyloxcide.

72. The combination comprising a conventional fixture for receiving one or more conventional hot cathode type fluorescent lamps and including a conventional rapid start ballast connected to supply heater voltage for such fluorescent lamp or lamps, and an emergency lighting unit to be substituted for a said fluorescent lamp in said fixture, said emergency lighting unit comprising:

a. an elongated generally cylindrical housing of length and diameter substantially equal to that of a conventional said fluorescent lamp; with said housing having mounted at its "A" end and its "B" end connection pins comparable to the bi-pin base ends of such fluorescent lamp;

b. a direct current power source comprising four rechargeable sealed cylindrical shaped "D" size battery cells contained within said housing and arranged as an "A" power supply of two cells and a "B" power supply of two cells;

c. a plurality of high intensity low voltage miniature lamps to be powered during emergencies by said direct current power source, contained within said housing and arranged in two groups as an "A" light source and a "B" light source, with a substantially equal number of said miniature lamps in each group;

d. electronic circuitry and components contained within said housing and utilizing power from said ballast supplied to said "A" end connection pins for normally heating a cathode of said fluorescent lamp, for charging the batteries of said "A" power supply, monitoring the condition of said batteries and reacting accordingly, detecting the state of the normal alternating current electric power source responsive to signals present at said "A" connection pins and reacting upon failure of the normal alternating current power source to connect the "A" power supply to the "A" light source and the "B" power supply to the "B" light source;

e. electronic circuitry and components contained within said housing and utilizing power from said ballast supplied to said "B" end connection pins for normally heating a cathode of said fluorescent lamp, for charging the batteries of said "B" power supply.

73. The device as in claim 72 wherein said fluorescent lamp is a $1\frac{1}{2}$ inch by 36 inch 30 watt size.

74. The device as in claim 72 wherein said fluorescent lamp is a $1\frac{1}{2}$ inch by 48 inch 40 watt size.

75. The device as in any one of claims 72, 73, or 74 wherein said batteries are of the sealed type and said miniature lamps are connected in parallel.

76. The device as in claim 75 wherein said batteries are of the sealed lead acid type.

77. The device as in claim 76 wherein said miniature lamps of said "A" light source and said "B" light source are disposed in respective linear arrays the central axes of which are parallel to the longitudinal axis of said elongated housing.

78. The device as in claim 76 wherein said batteries are rated at 2 volts and 2.5 ampere hours capacity; wherein said electronic circuitry and components includes means for charging said batteries in parallel and connecting them to said miniature lamps in series.

79. The device as in claim 77 wherein said miniature lamps are of a long, axial, non-wound filament type with the filament having no intermediate support.

80. The device as in claim 78 wherein said "A" light source and "B" light source are each mounted on a respective elongated board having a light reflecting surface.

81. The device as in claim 75 wherein said signals present at said connection pins comprise periodic pulses and said detecting portion of said electronic circuitry and components will detect failure of the normal alternating current power source responsive to the absence of a predetermined number of consecutive said periodic pulses.

82. The device as in claim 72 wherein the monitoring portion of said electronic circuitry and components comprises electrical means for activating said emergency lighting unit to the shutdown mode upon the batteries of the associated power supply reaching a predetermined voltage level due to discharge.

83. The device as in claim 82 wherein there is additionally provided manual means for activating said emergency lighting unit to the shutdown mode.

84. The device as in claim 83 wherein said manual means comprises a normally open magnetically actuable reed switch.

85. The device as in claim 83 wherein said electronic components and circuitry comprises means for causing said emergency lighting unit to return from the shutdown mode to its normal operative state only when said emergency lighting unit is installed in a said conventional fixture so as to receive power from said rapid start ballast.

86. The device as in claim 85 wherein said means for causing said emergency lighting unit to return from its shutdown mode to its normal operative state comprises kickstart circuit means.

87. The device as in claim 79 wherein there is additionally provided a respective pilot lamp for each said power supply and the energy available from said ballast in excess of that required at a given time for charging the batteries of a said power supply is utilized to power a respective said pilot lamp, whereby the degree of brilliance of said pilot lamp provides a visual indication of the state of charge of the batteries of said respective power supply.

88. The device as in claim 81 wherein the state of said normal alternating current power source is either "ON", "OFF", or "FAIL", and the detecting portion of said electronic circuitry and components comprises means for maintaining the detector in the re-set condition for the "ON" and "OFF" states and in the set condition for the "FAIL" state.

89. The device as in claim 81 wherein said periodic pulses are generated by a pulser unit.

90. The device as in claim 88 wherein there is additionally provided in said electronic circuitry and components a normally closed test switch and the opening of said test switch simulates the "FAIL" state to cause illumination of said light boards for test purposes.

91. The device as in claim 88 wherein said detecting portion will automatically upon removal from a said fixture assume the set condition to cause illumination of said light boards.

92. The device as in claim 72 wherein a transfer reactance capacitor is connected between one of said "A" connection pins and the corresponding "B" connection pin.

93. The device of claim 72 wherein a transfer reactance capacitor is connected in series with a normally closed safety switch between one of said "A" connection pins and the corresponding "B" connection pin.

94. The device of claim 93 wherein there is additionally provided removable means for retaining said safety switch in the open position.

95. The device as in any one of claims 37, 63, or 89 wherein said pulser unit comprises input terminals for supplying operating power and output terminals to which its output pulses are applied, with said input and output terminals being the same terminals.

96. The device as in claim 95 wherein the waveform of system power is applied to said input terminals and is applied to a delay network which feeds a zero crossing detector the output of which is fed to one input of a logic gate and the input of a pulse generator the output of which is fed to the other input of said logic gate, with the output of said logic gate being connected to trigger a high speed solid state switch which is connected in series with said input terminals.

97. The device as in claim 96 wherein said logic gate is an "OR" gate.

98. The device of claim 95 wherein said pulser unit comprises a switch portion and electronic circuitry and components necessary for generation of the requisite pulses and is designed to be substituted for a standard wall switch.

* * * * *